US007015298B2

(12) United States Patent
Van Den Berg et al.

(10) Patent No.: US 7,015,298 B2
(45) Date of Patent: Mar. 21, 2006

(54) COATING COMPOSITION COMPRISING A COMPOUND COMPRISING A SPIRO-ORTHO SILICATE GROUP

(75) Inventors: Keimpe Jan Van Den Berg, Sassenheim (NL); Klaus Hobel, Oosterbeek (NL); Josephus Christiaan Van Oorschot, Arnhem (NL); Jan Cornelis Van Beelen, Katwijk (NL); Huig Klinkenberg, Katwijk (NL)

(73) Assignee: Akzo Nobel N.V., Arnhem (NL)

( * ) Notice: Subject to any disclaimer, the term of this patent is extended or adjusted under 35 U.S.C. 154(b) by 14 days.

(21) Appl. No.: 10/671,511

(22) Filed: Sep. 29, 2003

(65) Prior Publication Data

US 2004/0122203 A1    Jun. 24, 2004

(30) Foreign Application Priority Data

Oct. 1, 2002    (EP)    .................................. 02079076

(51) Int. Cl.
*C08G 77/00*    (2006.01)
(52) U.S. Cl. ............................. 528/39; 528/25; 528/26; 528/27
(58) Field of Classification Search ............. 528/25–27
See application file for complete search history.

(56) References Cited

U.S. PATENT DOCUMENTS

| 3,465,020 A |   | 9/1969  | Frye |
|---|---|---|---|
| 3,565,859 A | * | 2/1971  | Calas et al. ................... 528/34 |
| 3,652,484 A |   | 3/1972  | Weissermel |
| 3,926,896 A | * | 12/1975 | Dumoulin ................... 524/261 |
| 4,788,288 A |   | 11/1988 | Pinschmidt et al. |
| 4,798,745 A |   | 1/1989  | Martz et al. |
| 4,864,055 A |   | 9/1989  | Pinschmidt et al. |
| 4,868,320 A |   | 9/1989  | Meier et al. |
| 5,155,170 A |   | 10/1992 | Baukema et al. |
| 5,214,086 A |   | 5/1993  | Mormile et al. |
| 5,336,807 A |   | 8/1994  | Burgoyne, Jr. et al. |

FOREIGN PATENT DOCUMENTS

| CA | 2319786        |    | 8/1999  |
|----|----------------|----|---------|
| DE | 198 07 504     | A1 | 8/1999  |
| EP | 0 134 691      | A2 | 3/1985  |
| EP | 0 259 172      | A2 | 3/1988  |
| EP | 0 314 993      | A2 | 5/1989  |
| EP | 0 842 963      | A1 | 5/1998  |
| GB | 1 208 907      | A  | 10/1970 |
| GB | 1 208 908      |    | 10/1970 |
| WO | WO 93/17060    |    | 9/1993  |
| WO | WO 97/31073    |    | 8/1997  |
| WO | WO 98/23691    |    | 6/1998  |
| WO | WO 00/64959    |    | 11/2000 |
| WO | WO 01/92362    | A1 | 12/2001 |
| WO | WO 03/074620   | A1 | 9/2003  |

OTHER PUBLICATIONS

Frye, C. L. "Stable Silicon Heterocyclic Derivatives of Branched Alkanediols" *Journal of Organic Chemistry* (1969), pp. 2496-2499.
Jitchum et al. "Synthesis of spirosilicates directly from silica and ethylene glycol/ethylene glycol derivatives." *Tetrahedron* (2001), pp. 3997-4003.
"Paints and Varnishes- Determination of Specular Gloss of Non-Metallica Paint Films at 20°, 60°, and 85°" *International Standard* (1994), pp. 1-9 ISO 2813:1994(E).
"Paints and Varnishes- Pendulum Damping Test. " *International Standard* (1998) pp. 1-9 ISO 1522:1998(E).

* cited by examiner

*Primary Examiner*—Marc S. Zimmer
(74) *Attorney, Agent, or Firm*—Oliff & Berridge, PLC

(57) ABSTRACT

The invention pertains to a coating composition comprising a compound comprising at least one spiro-ortho silicate group and a hydroxyl-reactive cross-linker, to a process for curing the composition, and to the use of the composition. The coating composition of the current invention can be formulated to a coating composition having a low content of volatile organic solvents, is curable at a temperature as low as 5° C., and the cured coating composition of the current invention is essentially free of unreacted low-molecular weight blocking agents. Further, the pot life: drying time ratio of coating compositions according to the invention is particularly favorable.

10 Claims, No Drawings

COATING COMPOSITION COMPRISING A COMPOUND COMPRISING A SPIRO-ORTHO SILICATE GROUP

The invention pertains to a coating composition comprising a silicon heterocyclic compound and a hydroxyl-reactive cross-linker, to a process for curing the composition, and to the use of the composition.

Such a composition is known from British Patent GB 1208907. This publication describes two-component polyurethane compositions comprising a polyurethane prepolymer with residual isocyanate groups and a pentacoordinate silicon complex. The silicon complex is charged and comprises a cation formed from an amine as counter-ion. Upon heating the composition to 177° C. the amine is released from the silicon complex and the amine causes the isocyanate-functional prepolymer to cure.

This composition has several drawbacks. Firstly, the pentacoordinate silicon complex is a crystalline solid of poor solubility in organic solvents and in the polyurethane prepolymer. Therefore, these compositions are not suitable for the preparation of a coating composition having a low content of volatile organic solvents in order to comply with current and future environmental legislation. A second disadvantage of the composition disclosed in GB 1208907 lies in its curing temperature of 177° C. Such a high curing temperature undesirably limits the possible application areas of the composition. Thus, the composition is not suitable for the (re)finishing of cars, large transportation vehicles, airplanes, nor for substrates which would not withstand a high curing temperature, e.g., plastic or wood.

Thirdly, the silicon complex serves merely as a blocking agent for the amine which causes the isocyanate-functional prepolymer to cure. Thus the part of the pentacoordinate silicon complex remaining after release of the amine will not form part of the cross-linked network to be formed. Rather, it will remain embedded as a low-molecular weight compound in the polymer matrix. This will detract from the properties of the cross-linked polymer and additionally encompasses the risk of release of the low-molecular weight compound to the environment during curing or use.

The invention now provides a coating composition of the aforementioned type which is not restricted by the above-mentioned drawbacks.

The coating composition of the current invention comprises a compound comprising at least one spiro-ortho silicate group (hereinafter spiro-ortho silicate will be abbreviated to SOS) and a hydroxyl-reactive cross-linker.

It should be noted that German Patent Application DE 198 07 504-A discloses a process for the surface cross-linking of super-absorbing polymer particles, wherein SOS group-comprising compounds are used as cross-linkers. Cross-linking occurs by transesterification at elevated temperature, preferably at 120° C. to 220° C. The surface-cross-linked super-absorbing polymer particles are reported to possess an increased water retention capability. Coating compositions are not disclosed in this publication.

SOS group-comprising compounds comprise a tetravalent silicon atom. Such compounds generally have a good solubility in organic solvents and are miscible with hydroxyl-reactive cross-linkers. In many cases SOS group-comprising compounds are low-viscous liquids. Therefore, the coating composition of the current invention can be formulated to a coating composition having a low content of volatile organic solvents. It is also within the scope of the current invention to formulate a coating composition free of volatile organic solvents.

The coating composition of the current invention can be cured at a lower temperature than the composition disclosed in GB 1208907, for example at a temperature as low as 5° C.

The coating composition of the current invention is a composition having latent hydroxyl groups. In the presence of water or moisture from the air the SOS groups will be hydrolyzed, forming alcoholic hydroxyl groups and silanol groups. It has been found that when a hydroxyl-reactive cross-linker, i.e. a compound comprising at least two hydroxyl-reactive groups, is present in the coating composition, the deblocked alcoholic hydroxyl groups can react with the hydroxyl-reactive groups to give a cross-linked polymer. Additionally, the silanol groups formed can participate in the reaction with the hydroxyl-reactive cross-linker or react with one another in a condensation reaction, or both. Thus, the cured coating composition of the current invention is essentially free of unreacted low-molecular weight blocking agents which might be released to the environment during curing or use.

Further, because of the stability of the SOS group-comprising compounds in the absence of moisture the pot life: drying time ratio of coating compositions according to the invention is particularly favourable, because hydrolysis of the SOS group only takes place in the presence of water or moisture. The coating films prepared from the coating composition according to the invention also exhibit an excellent car wash resistance, i.e. resistance to damage and/or loss of gloss as a consequence of car wash treatment.

SOS group-comprising compounds can be used as main binders or as reactive diluents in the coating composition of the present invention.

SOS groups can be represented by a structure according to formula (I)

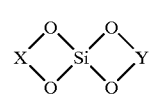

(I)

wherein X and Y may be the same or different and represent the residue of a linear or branched polyol. Preferably, the polyol is a diol having 2 to 80 carbon atoms, preferably having 2 to 20 carbon atoms, and most preferably having 2 to 10 carbon atoms. Suitable diols are p,z-diols, wherein z-p is an integer from 1 to 17. Said p,z-diols may optionally contain one or more hetero-atoms from the group of oxygen, nitrogen, sulphur, and phosphorus, and/or one or more groups selected from the group of amide, thioamide, thioester, urethane, urea, sulphone, sulphoxy, ether, ester, and olefinic unsaturation. The p,z-diols may optionally be substituted with one or more groups selected from epoxy, cyano, halogen, amino, thiol, hydroxyl, nitro, phosphorus, sulphoxy, amido, ether, ester, urea, urethane, thioester, thioamide, amide, carboxyl, carbonyl, aryl, acyl, and olefinically unsaturated groups.

It is also within the scope of the invention that either or both of X and Y form part of or have links to a polymer or oligomer structure.

The present SOS group-comprising compounds are known as such and can be prepared in several ways.

One such way is the reaction of a diol and a suitable silicon derivative such as a tetraalkyl orthosilicate or a silicon tetrahalide. Such reactions are described by C. L.

Frye in *Journal of Organic Chemistry* 34 (1968), pp. 2496–2499. Suitable diols for this reaction are as described above.

An alternative preparation of SOS group-comprising compounds is described by Wongkasemijt et al. in *Tetrahedron* 57 (2001), pp. 3997–4003. This publication describes the direct synthesis of SOS group-comprising compounds from fumed silica and 1,2-diols or 1,3-diols.

SOS group-comprising compounds wherein X and Y represent the residues of p,z-diols wherein z-p is in the range of 1 to 14 are preferred, more preferably z-p is in the range of 1 to 5. Examples of such preferred p,z-diols are diols wherein z-p is 1, such as ethylene glycol, 1,2-propanediol, 1,2-butanediol, 2,3-butanediol, 1,2-hexanediol, 2,3-dimethyl-2,3-butanediol (pinacol); p,z-diols wherein z-p is 2, such as 1,3-propanediol, 2-butyl-2-ethyl-1,3-propanediol, 2-ethyl-1,3-hexanediol, and 2,2-dimethyl-1,3-propanediol; and p,z-diols wherein z-p is 3, such as 2,5-hexanediol, 2-methyl-1,4-pentanediol trimethylolpropane monoethers, and pentaerythritol diethers.

Also suitable are trimethylolpropane, pentaerythritol, and pentaerythritol monoethers.

In a further preferred embodiment of the invention in the SOS group-comprising compounds X and Y are equal. It is particularly preferred that X and Y are selected from the residues of 2-butyl-2-ethyl-1,3-propanediol, 2-ethyl-1,3-hexanediol, and trimethylolpropane monoallylether. These preferred SOS group-comprising compounds have the structures shown in formulae Ia, Ib, and Ic, respectively:

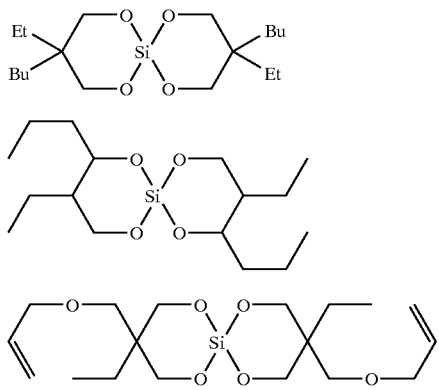

Ia

Ib

Ic

The different regio- and stereoisomers of the structures represented by formulae Ia, Ib, and Ic are to be taken as included in the formulae.

The coating composition according to the invention comprises a hydroxyl-reactive cross-linker comprising at least two hydroxyl-reactive groups. Examples of suitable hydroxyl-reactive groups are isocyanate, thioisocyanate, epoxy, episulfide, acetal, carboxylic acid, carboxylic anhydride, carboxylic acid ester, carbodiimide, alkoxy silane groups, Michael-acceptor groups, and etherified amino groups. Also, mixtures of these groups are included.

Examples of compounds comprising at least two isocyanate groups are aliphatic, alicyclic, and aromatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 2,4-trimethyl hexamethylene diisocyanate, 2,4,4-trimethyl hexamethylene diisocyanate, dodecamethylene diisocyanate, α,α'-dipropyl ether diisocyanate, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, m- and p-phenylene diisocyanate, 1,3- and 1,4-bis (isocyanate methyl) benzene, 1,5-dimethyl-2,4-bis (isocyanate methyl) benzene, 1,3,5-triisocyanate benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, naphthalene-1,5-diisocyanate, isophorone diisocyanate, 3-isocyanatomethyl-1-methyl-1-isocyanatocyclohexane, lysine triisocyanate, 4-isocyanatomethyl-1,8-octanediisocyanate, and transvinylidene diisocyanate, and mixtures of the aforementioned polyisocyanates.

Also, such compounds may be adducts of polyisocyanates, e.g., biurets, isocyanurates, allophanates, uretdiones, and mixtures thereof. Examples of such adducts are the isocyanurate of hexamethylene diisocyanate, available from Rhodia under the trade designation Tolonate® HDT, the uretdione of hexamethylene diisocyanate, available from Bayer under the trade designation Desmodur® N3400, the allophanate of hexamethylene diisocyanate, available from Bayer under the trade designation Desmodur® LS 2101, and the isocyanurate of isophorone diisocyanate, available from Degussa under the trade designation Vestanat® T1890. Other examples of suitable adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, and the adduct of 1 molecule of pentaerythritol to 4 molecules of toluene diisocyanate.

Furthermore, (co)polymers of isocyanate-functional monomers, such as α,α'-dimethyl-m-isopropenyl benzyl isocyanate or 2-isocyanatoethyl methacrylate, are suitable for use. Finally, the above-mentioned isocyanates and adducts thereof may be present in the form of blocked isocyanates, as is known to the skilled person.

Examples of compounds comprising at least two epoxy groups are solid or liquid epoxy compounds, such as the di- or polyglycidyl ethers of aliphatic, cycloaliphatic, or aromatic hydroxyl compounds such as ethylene glycol, glycerol, cyclohexane diol, mononuclear di- or polyvalent phenols, bisphenols such as Bisphenol-A and Bisphenol-F, and polynuclear di- or polyvalent phenols; polyglycidyl ethers of phenol formaldehyde novolac; epoxidized divinyl benzene; epoxy compounds comprising an isocyanurate group; an epoxidized polyalkadiene such as epoxidized polybutadiene; hydantoin epoxy resins; epoxy resins obtained by epoxidizing aliphatic and/or cycloaliphatic alkenes, such as dipentene dioxide, dicyclopentadiene dioxide, and vinylcyclohexene dioxide; and glycidyl groups-comprising resins, such as polyesters or polyurethanes having two or more glycidyl groups per molecule; or mixtures of the aforementioned epoxy compounds. Preferably, use is made of the aforementioned cycloaliphatic compounds comprising two or more epoxy groups.

Alternatively, use is made of a (co)polymer of ethylenically unsaturated epoxy groups comprising compounds such as glycidyl(meth)acrylate, N-glycidyl(meth)acrylamide and/or allyl glycidyl ether and, if so desired, one or more copolymerizable, ethylenically unsaturated monomers.

Examples of compounds comprising at least two acetal groups are disclosed, int. al., in patent publications U.S. Pat. No. 4,788,288, U.S. Pat. No. 4,864,055, U.S. Pat. No. 5,155,170, U.S. Pat. No. 5,336,807, and WO 03/074620. Other suitable acetal-functional compounds include compounds obtained by reacting aminobutyraldehyde di(m)ethyl acetal (ABDA) and carboxyl ester-, isocyanate- or cyclocarbonate-functional (co)oligomers or (co)polymers, e.g., polyester, polyacrylate, and polyurethane. An example of such a polymer is the copolymer of glycerol cyclocarbonate methacrylate, butylacrylate, and styrene. Also, mixtures of compounds comprising at least two acetal groups can be employed.

Examples of compounds comprising at least two carboxylic acid groups include saturated or unsaturated aliphatic, cycloaliphatic, and aromatic polycarboxylic acids, such as malonic acid, succinic acid, adipic acid, azelaic acid, sebacic acid, decane dicarboxylic acid, dimer fatty acid, maleic acid, tetrahydrophthalic acid, hexahydrophthalic acid, hexahydroendomethylene tetrahydrophthalic acid, phthalic acid, isophthalic acid, terephthalic acid, trimellitic acid, pyromellitic acid, 3,6-dichlorophthalic acid, tetrachlorophthalic acid, and mixtures thereof.

Examples of carboxylic anhydride-functional compounds include the addition polymers of unsaturated cyclic anhydride monomers, e.g., maleic anhydride, itaconic anhydride, or citraconic anhydride. Furthermore, copolymers of said anhydride monomers and one or more ethylenically unsaturated monomers can be employed. These copolymers can contain 10–50 wt. % of anhydride groups.

Examples of ethylenically unsaturated monomers are styrene, substituted styrene, vinyl chloride, vinylacetate, and esters of acrylic or methacrylic acid, e.g., methyl(meth)acrylate, ethyl(meth)acrylate, propyl(meth)acrylate, isopropyl(meth)acrylate, butyl(meth)acrylate, t-butyl(meth)acrylate, n-hexyl(meth)acrylate, 2-ethylhexyl(meth)acrylate, cyclohexyl(meth)acrylate, 2,2,5-trimethyl cyclohexyl(meth)acrylate, and isobornyl(meth)acrylate. The anhydride-functional (co)polymer can contain small quantities, e.g., 1 to 10 wt. %, of ethylenically unsaturated carboxylic acid groups, e.g., (meth)acrylic acid. The molecular weight of the anhydride-functional (co)polymer preferably is 1,000–50,000.

When the composition according to the present invention is used as coating composition for a top coat, the aforesaid ethylenically unsaturated monomer preferably is used in a molar ratio of 1:1 with the anhydride monomer, as described in U.S. Pat. No. 4,798,745.

Alternatively, the carboxylic anhydride-functional compound can be an adduct of an anhydride monomer and a functional group-comprising polymer. Examples of such adducts are: the adduct of polybutadiene or a butadiene/styrene copolymer to maleic anhydride; the adduct of maleic anhydride to a styrene/allyl alcohol copolymer esterified with an unsaturated fatty acid, resins of terpene and maleic anhydride; adducts of hydroxyl-comprising polymers and anhydride monomers, e.g., copolymers of hydroxyethyl (meth)acrylate or styrene/allyl alcohol and a tricarboxylic compound capable of forming anhydride groups, such as described in EP-A-0 259 172-A; the adduct of trimellitic anhydride to a polyol, such as described in EP-A-0 134 691; and the adduct of a thiol groups-comprising polymer to an unsaturated cyclic anhydride such as maleic anhydride, itaconic anhydride or citraconic anhydride. Also, mixtures of anhydride-functional compounds can be employed.

Suitable compounds with carboxylic acid ester groups are generally known to the skilled person. Examples include addition (co)polymers of esters of (meth)acrylic acid and esters of at least difunctional carboxylic acids, such as dimer fatty acids. It is preferred that esters of lower alkyl alcohols are employed as hydroxyl-reactive cross-linker.

Compounds and resins with alkoxy silane groups suitable for use as hydroxyl-reactive cross-linker in the composition of the invention are well known in the art. Examples are described in WO 98/23691. Further examples of alkoxysilane-functional compounds are alkoxysilanes of the following general formula:

wherein T is a hydrolyzable group such as —OCH$_3$, —OC$_2$H$_5$, —OCH(CH$_3$)$_2$ or —OC$_2$H$_4$OCH$_3$ and R$^1$ and R$^2$ are reactive groups which may be the same or different. Examples of such reactive groups include vinyl, aminoalkyl, thiolalkyl, epoxyalkyl, and methacryloxyalkyl groups. Also, the reaction products of alkoxysilane-functional compounds and mixtures of alkoxysilane-functional compounds and/or reaction products of these can be employed.

Examples of vinyl-functional alkoxysilanes include vinyl triethoxysilane and vinyl trimethoxysilane. As an example of a reaction product of a vinyl-functional alkoxysilane may be mentioned the silicone resin formed by the reaction of CH$_2$=CH—Si(T)$_3$ and styrene.

Reaction products of amino-functional alkoxysilanes can be made by reacting such silanes with esters of carboxylic acids R$^3$(COOR$^4$)$_n$, wherein n is an integer of at least 1, R$^3$ is a linear or branched, optionally unsaturated, hydrocarbon group, and R$^4$ is a lower alkyl group, e.g., a C$_{1-4}$ alkyl group, e.g.: NH$_2$(CH$_2$)$_3$Si(T)$_3$+R$^3$COOR$^4$→R$^3$CO—NH(CH$_2$)$_3$Si (T)$_3$ 2 NH$_2$(CH$_2$)$_3$Si(T)$_3$+1 R$^4$OOCR$^3$COOR$^4$→(T)$_3$Si (CH$_2$)$_3$NH—OCR$^3$CO—NH(CH$_2$)$_3$Si(T)$_3$.

For example, the adduct of 1 mole of diethyl malonate to 2 moles of 3-aminopropyl trimethoxysilane is a suitable alkoxysilane-containing compound. Also suitable for use are reaction products of amino-functional alkoxysilanes and isocyanate-functional compounds.

One example of a reaction product of an epoxy-functional silane compound is the reaction product of β-(3,4-epoxycyclohexyl) ethyl trimethoxysilane and amines, acids, and alcohols.

Examples of reaction products of methacryloxyalkyl trialkoxysilane are reaction products of γ-methacryloxypropyl trimethoxysilane and γ-methacryloxypropyl tri(β-methoxyethoxy)silane and vinyl-functional monomers, such as styrene and methyl methacrylate.

Compounds with Michael acceptor groups suitable for use as hydroxyl-reactive cross-linkers include any compound containing two or more olefinically unsaturated groups, with the olefinically unsaturated groups comprising at least one electron-withdrawing functionality linked to a carbon atom of the unsaturated bond, as described in WO 00/64959 incorporated herein by reference.

Suitable compounds comprising etherified amino groups are generally known to the skilled person. Examples are urea resins, guanamine resins, and melamine resins, and mixtures of these. Examples of urea resins are etherified methylol urea, butyl urea, and isobutyl urea. One example of a guanamine resin is tetra(methoxymethyl)benzoguanamine. Examples of melamine resins are hexa(methoxymethyl) melamine (HMMM) and isobutylated melamine.

It is also possible to use mixtures of the above-mentioned compounds comprising hydroxyl-reactive groups.

It is preferred that the coating composition of the current invention comprises a compound comprising at least two isocyanate groups as hydroxyl-reactive cross-linker.

In addition to the disclosed SOS-functional compounds and said hydroxyl-reactive compounds, other compounds can be present in the coating composition according to the present invention. Such compounds may be main binders and/or reactive diluents, optionally comprising reactive groups which may be cross-linked with the aforesaid hydroxyl-functional compounds and/or hydroxyl-reactive compounds. Examples include hydroxyl-functional binders, e.g., polyester polyols such as described in H. Wagner et al., *Lackkunstharze*, 5$^{th}$ Ed., 1971 (Carl Hanser Verlag, Munich), polyether polyols, polyacrylate polyols, polyurethane polyols, cellulose acetobutyrate, hydroxyl-functional epoxy resins, alkyds, and dendrimeric polyols such as described in International patent application WO 93/17060. Also, hydroxyl-functional oligomers and monomers, such as castor oil and trimethylolpropane, may be present.

In particular, the coating composition can also comprise other latent hydroxyl-functional compounds such as compounds comprising bicyclic orthoester or spiro-orthoester groups. These compounds and their use are described in WO 97/31073.

The coating composition according to the invention can also comprise thiol-functional oligomers and polymers, for example such as described in International Patent application WO 01/92362.

Finally, ketone resins, asparagyl acid esters, and latent or non-latent amino-functional compounds such as oxazolidines, ketimines, aldimines, diimines, secondary amines, and polyamines can be present. These and other compounds are known to the skilled person and are mentioned, int. al., in U.S. Pat. No. 5,214,086.

In the coating composition according to the invention the equivalent ratio of hydroxyl-reactive groups to alcoholic hydroxyl groups preferably is between 0.5 and 4.0, more preferably between 0.7 and 2.5. By alcoholic hydroxyl groups the sum of latent alcoholic hydroxyl groups and optionally present non-latent alcoholic hydroxyl groups is meant. Thus, silanol groups are not included in the definition of alcoholic hydroxyl groups.

The invention further encompasses a process for curing the present coating composition. More particularly, the latent alcoholic hydroxyl groups and the silanol groups of the SOS-functional compound have to be deblocked. The alcoholic hydroxyl groups are reacted with the hydroxyl-reactive groups of the hydroxyl-reactive cross-linker. The silanol groups formed can either participate in the reaction with the hydroxyl-reactive cross-linker or react with one another in a condensation reaction to allow the present composition to be cured.

The deblocking of the latent alcoholic hydroxyl groups and of the silanol groups of SOS group-comprising compound takes place under the influence of water in the form of, e.g., moisture from the air or added water. Said deblocking reactions can be accelerated by the presence of a suitable deblocking catalyst, for example by an acid or a base. Preferably, the deblocking catalyst is selected from Lewis acids, Lewis bases, and Brönstedt bases. Examples of suitable catalysts are dibutyl tin dilaurate, 1,4-diazabicyclo[2.2.2]octane, and 1,8-diazabicyclo[4.5.0]undec-7-ene. The deblocking catalyst may be used in an amount of 0 to 10 wt. %, preferably 0.001 to 5 wt. %, more preferably in an amount of 0.01 to 1 wt. %, calculated on solid matter (i.e., the amount of SOS group-comprising compound, the hydroxyl-reactive compound, and, optionally, the above-mentioned other compounds).

The reaction of the deblocked alcoholic hydroxyl groups of the SOS group-comprising compound, the hydroxyl-reactive groups of the cross-linker, the silanol groups formed and, optionally, further compounds present in the coating composition comprising hydroxyl groups or hydroxyl-reactive groups, preferably takes place under the influence of a cross-linking catalyst. Such catalysts are known to the skilled person. The cross-linking catalyst may be used in an amount of 0 to 10 wt. %, preferably 0.001 to 5 wt. %, more preferably in an amount of 0.01 to 1 wt. %, calculated on solid matter (i.e., the amount of SOS group-comprising compound, the hydroxyl-reactive compound, and, optionally, the above-mentioned other compounds).

As an example of the various hydroxyl-reactive groups the following cross-linking catalysts may be mentioned. Polyisocyanates: dimethyl tin dilaurate, dibutyl tin dilaurate, dibutyl tin diacetate, tin octoate, dimethyl tin dichloride, zinc octoate, aluminium chelate, and catalysts based on zirconium or bismuth; polyepoxy compounds: tertiary amines and Lewis acids such as $BF_3$ or organic complexes thereof; polyacetal compounds: paratoluene sulphonic acid and dodecyl benzene sulphonic acid; polycarboxylic acid compounds: dodecyl benzene sulphonic acid, polyanhydride compounds, and carboxylic acid ester compounds; organotin compounds, organic titanium compounds, acids, and bases; alkoxysilane compounds: organotin compounds, phosphoric acid, paratoluene sulphonic acid, dodecyl benzene sulphonic acid, and tertiary amines; Michael acceptor groups: strong acids and bases, e.g. alkali metal alcoholates, tertiary amines; and etherified amino groups: dodecyl benzene sulphonic acid.

It should be noted that in certain cases said deblocking catalyst and said cross-linking catalyst may be identical, i.e. one catalyst can catalyze both the deblocking of the SOS group-comprising compound and the above-mentioned cross-linking reactions.

Due to the excellent pot life of the coating composition according to the invention, it can be formulated as a one-component system. Alternatively, the coating composition according to the invention can be part of a multi-component system, for instance a two-component system. For example, one component can comprise both the SOS group-comprising compound and the hydroxyl-reactive compound. The second component can comprise the deblocking catalyst for the hydrolysis of the SOS group-comprising compound.

Alternatively, a three-component system can be employed. For example, one component can comprise the SOS group-comprising compound. A second component can comprise the hydroxyl-reactive component. A third component can comprise the deblocking catalyst for the hydrolysis of the SOS-functional compound.

The coating composition can additionally comprise the usual additives such as solvents, pigments, fillers, leveling agents, emulsifiers, anti-foaming agents and rheology control agents, reducing agents, antioxidants, HALS-stabilizers, UV-stabilizers, water traps such as molecular sieves, and anti-settling agents.

It is preferred that the coating composition according to the invention comprises less than 480 g/l of volatile organic compounds (VOC), more preferably the coating composition comprises less than 250 g/l of VOC.

Application of the coating composition onto a substrate can be via any method known to the skilled person, e.g., via rolling, spraying, brushing, flow coating, dipping, and roller coating. Preferably, a coating composition such as described is applied by spraying.

The coating composition of the present invention can be applied to any substrate. The substrate may be, for example, metal, e.g., iron, steel, and aluminium, plastic, wood, glass, synthetic material, paper, leather, or another coating layer. The other coating layer can be comprised of the coating composition of the current invention or it can be a different coating composition. The coating compositions of the current invention show particular utility as clear coats (over base coats, water borne and solvent borne), base coats, pigmented top coats, primers, and fillers. The compositions are suitable for coating objects such as bridges, pipelines, industrial plants or buildings, oil and gas installations, or ships. The compositions are particularly suitable for finishing and refinishing automobiles and large transportation vehicles, such as trains, trucks, buses, and airplanes.

The applied coating composition can be cured very effectively at a temperature of, e.g., 0–60° C. If so desired, the coating composition may be oven cured, e.g. at a temperature in the range of 60–120° C.

It is to be understood that the term coating composition as used herein also includes its use as adhesive composition.

The invention will be elucidated further with reference to the following examples.

In the examples the following abbreviations are used:

| Dibutyl tin dilaurate | DBTDL |
|---|---|
| 1,4-Diazabicyclo[2.2.2]octane | DABCO |
| 1,8-Diazabicyclo[4.5.0]undec-7-ene | DBU |
| n-Butylacetate | BuAc |
| Isopropylalcohol | IPA |
| Xylene | Xy |
| 2-Butanone | MEK |
| Tetraethyl orthosilicate | TEOS |

In the examples the following materials are used:

Tolonate® HDT LV is the cyclic isocyanurate trimer of hexamethylene diisocyanate, ex Rhodia.

Byk® 331 is a surface additive, ex Byk Chemie.

A commerical two-component clear coat based on a hydroxyl-functional binder and a polyisocyanate.

Unless otherwise stated, the properties of the coating compositions and the resulting films were measured as follows:

The pot life was defined as the time period wherein the viscosity of the coating composition after initial mixing of all compounds is doubled.

The drying time is the time until the coating is touch dry. Drying was evaluated manually. The touch dry drying state is achieved when a mark in the coating layer from firm pushing with the thumb disappears within 1–2 minutes.

The solvent resistance was determined by 1-minute exposure of the film to a cotton wool wad soaked with MEK. The solvent resistance was evaluated visually on a scale from 0 to 5, wherein 0 means dissolution of the film and 5 means no damage.

The Persoz hardness was determined according to ISO1522.

The appearance was determined visually. When there were no visual defects in the coating layer, the appearance was judged to be ok. When blisters were present, the appearance was judged to be not ok (nok).

For determination of the car wash resistance first the initial gloss of a coated panel was measured. The coated panel was subjected to 10 minutes brushing with a circular nylon brush having a diameter of 64 cm, rotating with 150 revolutions per minute. During brushing, the coated panel was moistened with an aqueous solution of sodium dodecylsulfate containing aluminum oxide particles as abrasive. After brushing, the panel was rinsed with water and dried. After two hours the gloss was measured to determine the gloss after car wash treatment. Subsequently, the panels were heated to 60° C. for 30 minutes and stored at room temperature for six days, whereupon the gloss was measured again to determine the gloss after reflow. A lower decrease of gloss after the car wash treatment indicates a better car wash resistance of the coated panels. All gloss measurements were carried out in accordance with ISO 2813 at an angle of 20°, the result being indicated in gloss units.

Preparation of 2-butyl-2-ethyl-1,3-propanediol spiro-orthosilicate (SOS 1)

A 1 l 4-necked flask was filled with 320 g 2-butyl-2-ethyl-1,3-propanediol (2 moles), 100 g xylene, and 208 g TEOS (1 mole). 0.1 g sodium was dissolved in 5 ml ethanol and added to the reaction mixture. The flask was heated to 90° C. Ethanol was distilled from the reaction mixture using a 30 cm packed column. The reaction mixture was gradually heated to 180° C. until all the ethanol was removed. The xylene was removed by using vacuum distillation (10 mbar). The packed column was replaced by a 30 cm Vigreaux column. The vacuum was increased to 0.4 mbar and the reaction mixture was heated to 195° C. The product distilled from the reaction mixture (bp=166° C., 0.4 mbar). 309 g 2-butyl-2-ethyl-1,3-propanediol spiro-orthosilicate was obtained (91% yield).

Preparation of 2-ethyl-1,3-hexanediol spiro-orthosilicate (SOS 2)

A 1 l 4-necked flask was filled with 235 g 2-ethyl-1,3-hexanediol (1.6 moles), 80 g xylene, and 167 g TEOS (0.8 moles). 0.1 g sodium was dissolved in 4 ml ethanol and added to the reaction mixture. The flask was heated to 90° C. Ethanol was distilled from the reaction mixture using a 30 cm packed column. The reaction mixture was gradually heated to 200° C. until all the ethanol was removed. The reaction mixture was cooled to 150° C. and the xylene was removed by using vacuum distillation (20 mbar). The packed column was replaced by a 30 cm Vigreaux column. The vacuum was increased to 0.1 mbar and the reaction mixture was heated to 158° C. The product distilled from the reaction mixture (bp=126° C., 0.1 mbar). 250 g 2-ethyl-1,3-hexanediol spiro-orthosilicate was obtained (98% yield).

Preparation of trimethylolpropane mono allyl ether spiro-orthosilicate (SOS 3)

A 500 ml 4-necked flask was filled with 200 g trimethylolpropane mono allyl ether (1.2 moles) and 123 g TEOS (0.6 moles). 0.1 g sodium was dissolved in 4 ml methanol and added to the reaction mixture. The flask was heated to 90° C. Ethanol was distilled from the reaction mixture using a 30 cm packed column. The reaction mixture was gradually heated to 260° C. until all the ethanol was removed. The packed column was replaced by a 30 cm Vigreaux column. The vacuum was increased to 0.2 mbar and the reaction mixture was heated to 185° C. The product distilled from the reaction mixture (bp=161° C., 0.2 mbar). 72.4 g Trimethylolpropane mono allyl ether spiro-orthosilicate was obtained (33% yield).

Coating Compositions 1–10 and Comparative Coating Composition 11

The preparation of coating compositions 1 to 10 according to the invention is summarized in Table 1. Composition 11 is a comparative composition without SOS. Table 1 reports the components and their amounts in parts by weight. The components were added in the order of listing in the table and were mixed manually by stirring with a spatula.

All formulations 1–10 of Table 1 had an approximate starting viscosity of 110 mPas at a theoretical solids contents of about 82–87 wt. %. Comparative composition 11 had a viscosity of 220 mPas at a theoretical solids content of 85 wt. %. Thus, in order to achieve the same viscosity, comparative composition 9 requires a higher organic solvent content than the compositions according to the invention.

The coating compositions were applied to tin plates in a layer thickness of approximately 60 μm with a hand draw bar and dried at room temperature or at 60° C.

For sprayable coating compositions the compositions 1–10 were diluted with a 1:1 mixture of BuAc/Xy to a viscosity of 55 mPas, leading to a theoretical solids content of about 79 wt. %. This corresponds to a volatile organic content of less than 250 g/l.

It can be concluded that all coating compositions 1–11 of Table 1 have an excellent pot life of more than 7 days.

From Table 2 one can conclude that all coating compositions 1–10 have a short drying time when cured at 60° C. The drying speed can be increased by the presence of a deblocking catalyst. The solvent resistance, hardness, and appearance of all catalyzed coatings are excellent. Comparative composition 11 has a relatively long drying time and an insufficient appearance due to the formation of blisters.

Table 3 summarizes the film properties of coating compositions 1–10 and comparative composition 11 cured at room temperature. The differences between the drying times of the coating compositions with or without a deblocking catalyst become more pronounced. However, even coating compositions 1 and 2 without a deblocking catalyst exhibit high hardness after 8 days of curing at room temperature. Comparative composition 11 dries slower than the coating compositions according to the invention.

All fully cured films of coating compositions 1–10 exhibit no damage after immersion in water for 4–6 hours.

The films prepared from coating composition 2 were also subjected to the car wash resistance test as described above. Table 4 gives an overview of the results in comparison with a commercial two-component clear coat based on a hydroxyl-functional binder and a polyisocyanate. Table 4 shows that the initial gloss, the gloss after car wash, and the gloss after reflow of films formed from the coating composition according to the invention are higher than the gloss of the commercial system. More importantly, it can be concluded that the films from the coating composition according to the invention exhibit a lower decrease of gloss after car wash treatment than the commercial system. Thus, the coating films according to the invention have an improved car wash resistance.

TABLE 1

Coating compositions 1–10 and comparative composition 11

| Component | Coating composition | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| SOS 1 | 5.00 | 5.00 | 5.00 | 5.00 | 5.00 | — | — | — | | | — |
| SOS 2 | — | — | — | — | — | 4.60 | 4.60 | 4.60 | | | — |
| SOS 3 | — | — | — | — | — | | | | 5.4 | 5.4 | — |
| Xylene | 1.50 | 1.50 | 1.50 | 1.50 | 1.50 | 1.00 | 1.00 | 1.00 | 1.25 | 1.25 | 1.50 |
| BuAc | 1.50 | 1.50 | 1.50 | 1.50 | 1.50 | 1.00 | 1.00 | 1.00 | 1.25 | 1.25 | — |
| 10% Byk 331 in BuAc | 0.15 | 0.15 | 0.15 | 0.15 | 0.15 | 0.20 | 0.20 | 0.20 | 0.25 | 0.25 | 0.20 |
| 10% DABCO in IPA | — | — | — | 0.25 | 0.50 | — | — | 0.23 | — | — | — |
| 10% DBU in BuAc | — | — | 0.25 | — | — | — | — | — | — | — | — |
| 10% DBTDL in BuAc/Xy | 0.25 | 0.50 | 0.50 | 0.50 | 0.50 | 0.46 | 0.92 | 0.92 | 0.52 | 0.36 | 0.50 |
| Tolonate ® HDT LV | 12.70 | 12.70 | 12.70 | 12.70 | 12.70 | 12.50 | 12.50 | 12.50 | 12.50 | 12.50 | 12.50 |
| Pot life (days) | >7 | >7 | >7 | >7 | >7 | >7 | >7 | >7 | >7 | >7 | >7 |

TABLE 2

Properties of films from coating compositions 1–10 and comparative composition 11, cured at 60° C.

| Property | Coating composition | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| Drying time at 60° C. (minutes) | 25 | 10 | <6 | 6 | 5 | 22 | 12 | 10 | 7 | 8 | 25 |
| Solvent-resistance after 1 day | n.d.** | 5 | 5 | 5 | 5 | 5 | 5 | 5 | n.d.** | n.d.** | n.d.** |
| Persoz hardness after 1 day | 145 | 174 | 179 | 263* | 174* | 188 | 214 | 225 | 162 | n.d.** | 209 |
| Persoz hardness after 8 days | 266 | 290 | 247 | 271 | 137 | 192 | n.d.** | n.d.** | 199 | 230 | 305 |
| Appearance | ok | ok | ok | ok | ok | ok | ok | ok | ok | ok | nok |

*determined after 3 days
**n.d. means that the values were not determined

TABLE 3

Properties of films from coating compositions 1–10 and comparative composition 11, cured at room temperature

| Property | Coating composition | | | | | | | | | | |
|---|---|---|---|---|---|---|---|---|---|---|---|
| | 1 | 2 | 3 | 4 | 5 | 6 | 7 | 8 | 9 | 10 | 11 |
| Drying time at room temp. (minutes) | >120 | 35–40 | 16 | 13 | 10 | >120 | 120 | 40 | 10–15 | 20–30 | >180 |
| Solvent-resistance after 1 day | n.d.** | 5 | 5 | 5 | 5 | 5 | 5 | 5 | n.d.** | n.d.** | n.d.** |
| Persoz hardness after 1 day | 76 | 91 | 129 | 155* | 77* | 192 | 191 | 181 | 99 | n.d.** | 125 |
| Persoz hardness after 8 days | 269 | 245 | 235 | 152 | 63 | 198 | n.d.** | n.d.** | 120 | 194 | 288 |
| Appearance | ok | ok | ok | ok | ok | ok | ok | ok | ok | ok | ok |

*determined after 3 days
**n.d. means that the values were not determined

TABLE 4

Car wash resistance of panels coated with coating composition 2

| Clear coat film | Initial Gloss | Gloss after Car Wash | Gloss after Reflow |
|---|---|---|---|
| Coating composition 2, dried at 60° C. | 85.0 | 77.2 | 81.6 |
| Coating composition 2, dried at room temperature | 85.4 | 76.2 | 81.7 |
| Commercial two-component clearcoat (comparison) | 83.5 | 69.8 | 77.7 |

The invention claimed is:

1. A coating composition comprising a silicon heterocyclic compound and a hydroxyl-reactive cross-linker, wherein the silicon heterocyclic compound is a compound comprising at least one tetravalent spiro-ortho silicate group that comprises latent alcoholic hydroxyl groups, and wherein hydroxyl-reactive groups of the hydroxyl-reactive cross-linker are selected from the group consisting of isocyanate groups, thioisocyanate groups, epoxy groups, episulfide groups, acetal groups, carboxylic acid groups, carboxylic anhydride groups, carboxylic acid ester groups, carbodiimide groups, alkoxy silane groups, Michael-acceptor groups, etherified amino groups and mixtures thereof.

2. A coating composition according to claim 1, characterized in that the compound comprising at least one spiro-ortho silicate group is selected from compounds according to the following formulae Ia, Ib, and Ic

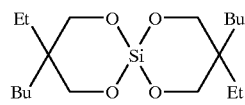

Ia

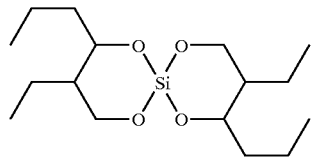

Ib

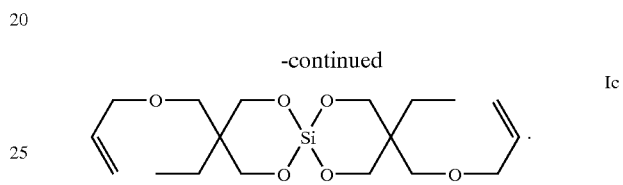

Ic

3. A coating composition according to claim 1, characterized in that the hydroxyl-reactive cross-linker is a compound comprising at least two isocyanate groups.

4. A coating composition according to claim 1, characterized in that it comprises less than 480 g/l of volatile organic compounds.

5. A coating composition according to claim 1, characterized in that it comprises a deblocking catalyst for the deblocking of the compound comprising at least one spiro-ortho silicate group.

6. A coating composition according to claim 1, characterized in that it comprises a cross-linking catalyst for the reaction between hydroxyl groups and the hydroxyl-reactive cross-linker.

7. A coating composition according to claim 1, optionally further comprising a component containing non-latent hydroxyl groups, characterized in that the equivalent ratio of hydroxyl-reactive groups to the sum of latent alcoholic hydroxyl groups and non-latent alcoholic hydroxyl groups to is between 0.5 and 4.0.

8. A process for curing a coating composition according to claim 1, characterized in that
 a) the latent alcoholic hydroxyl groups and the silanol groups of the spiro-ortho silicate groups are deblocked in the presence of moisture, optionally in the presence of a deblocking catalyst,
 b) the alcoholic hydroxyl groups are reacted with the hydroxyl-reactive groups of the hydroxyl-reactive cross-linker, optionally in the presence of a cross-linking catalyst, and
 c) the silanol groups formed participate in the reaction with the hydroxyl-reactive cross-linker and/or react with one another in a condensation reaction, optionally in the presence of the cross-linking catalyst.

9. A method of finishing and refinishing automobiles and large transportation vehicles, comprising applying the composition according to claim 1 to a substrate.

10. An adhesive composition comprising the composition according to claim 1, applied to a substrate.

* * * * *